April 1, 1941.   R. F. BROWN   2,237,213
PIPETTE
Filed May 31, 1939
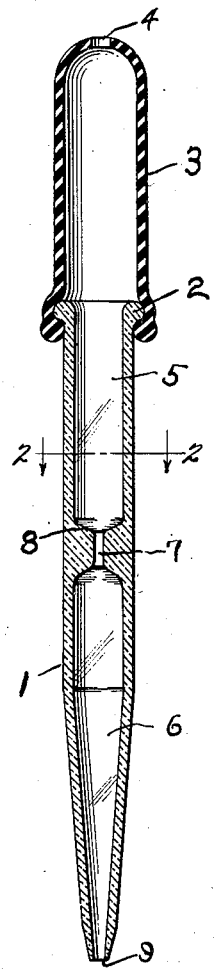
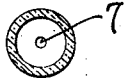
R. F. Brown   Inventor
By John Boyle Jr.   Attorney Patented Apr. 1, 1941

2,237,213

UNITED STATES PATENT OFFICE 2,237,213

PIPETTE

Ralph F. Brown, Millville, N. J.

Application May 31, 1939, Serial No. 276,710

6 Claims. (Cl. 221—102)

My invention relates to a pipette, and one of the objects of the invention is to provide a device of this character that will permit of the accurate measurement, particularly of small quantities of liquids. There are various arts where the accurate measurement of a small quantity of liquid may be desired, as in the manufacture of dental silicate cements, where only a few drops of liquid may be added to make a plastic mix. If added by way of the common medicine dropper, there may be a total deviation in delivery of approximately 20% in quantities of about 100 milligrams. However when using the construction that I have devised the approximate deviation for the same quantity will be about 2%.

In general, the pipette consists of an upper and lower chamber adapted to receive the liquid to be dispensed, the two chambers being connected by a capillary passage of such predetermined diameter, that the capillary adhesion of the contained liquid will exceed the action of gravity and retain a predetermined charge of liquid in the lower chamber, which can be dispensed for the desired purpose.

Referring to the drawing for a more complete disclosure of the invention.

Fig. 1 is a vertical section of one form of the pipette;

Fig. 2 is a transverse section on the line 2—2 of Fig. 1.

The body 1 of the pipette is formed of glass or other suitable materials such as plastics, wax or the like that do not have any reaction with the liquid being used. It is provided with a bead 2 at the top for engagement with the rubber bulb 3 that is provided with an air vent 4. The body portion 1 is formed to provide an upper overflow chamber 5 and a lower measuring chamber 6, the two chambers being connected by the capillary passage 7 of predetermined diameter. The bottom 8 of the chamber 5 is leveled off as much as possible so as to have the capillary passage 7 open into it as abruptly as possible, so as to have a sharp change in the capillary attraction of the liquid as the chamber 5 empties.

The diameter of the capillary tube will vary with the material of which the tube is made, the surface tension and specific gravity of the liquid and the amount of capillary attraction necessary to sustain a desired amount of liquid. When using the customary metaphosphoric acid that is used in dental silicate mixes and the volume to be dispensed is three drops, the diameter of the capillary in a glass tube is of the order of 0.25 millimeter. Since the gravity to be overcome in the measuring chamber 6 is a function of the height of the column of liquid therein, variations in the volume can be made by varying the diameter of the chamber 6. The lower opening 9 of the tube is about 1 millimeter, being small enough to prevent entrance of air into the tube.

In operation, the tip of the pipette is immersed in the liquid to be measured and the bulb 3 compressed with the vent 4 open. The vent is now closed and the bulb released from pressure so as to suck the liquid in to the lower chamber, through the constriction 7 and into the upper chamber 5. The vent 4 is now opened, whereupon the liquid will discharge until the weight of the liquid in the chamber 6 balances the force of capillary attraction in the constriction 7 and the top meniscus will then be adjusted to a definite level in the capillary constriction 7.

After properly cleaning the excess liquid from the outside of the tip, the contained liquid is dispensed by closing the vent 4 and compressing the bulb 2.

I claim:

1. A pipette for delivering a measured volume of liquid comprising a measuring chamber having a discharge opening, a capillary constriction above the measuring chamber, the diameter of the constriction being predetermined to provide such capillary adhesion of a contained liquid as will support a predetermined height of the liquid in the measuring chamber against the action of gravity.

2. A pipette for delivering a measured volume of liquid comprising a measuring chamber having a discharge opening, a capillary constriction above the measuring chamber, the diameter of the constriction being predetermined to provide such capillary adhesion of a contained liquid as will support a predetermined height of the liquid in the measuring chamber against the action of gravity and an overflow chamber above the constriction.

3. A pipette for delivering a measured volume of liquid comprising a measuring chamber having a discharge opening, a capillary constriction above the measuring chamber, the diameter of the constriction being predetermined to provide such capillary adhesion of a contained liquid as will support a predetermined height of the liquid in the measuring chamber against the action of gravity and an overflow chamber above the constriction, the bottom of the overflow chamber terminating abruptly into the constriction.

4. A pipette for delivering a measured volume of liquid comprising a measuring chamber having a discharge opening, a capillary constriction above the measuring chamber, the diameter of the constriction being predetermined to provide such capillary adhesion of a contained liquid as will support a predetermined height of the liquid in the measuring chamber against the action of gravity, and an overflow chamber above the constriction and a vented elastic bulb closing the upper end of the overflow chamber.

5. A pipette for delivering a measured volume of liquid comprising a measuring chamber having a discharge opening, a capillary constriction above the measuring chamber, the diameter of the constriction being predetermined to provide such capillary adhesion of a contained liquid as will support a predetermined height of the liquid in the measuring chamber against the action of gravity and means for discharging the liquid from the measuring chamber.

6. A pipette for delivering a measured volume of liquid comprising a measuring chamber having a discharge opening, a capillary constriction above the measuring chamber, the diameter of the constriction being predetermined to provide such capillary adhesion of a contained liquid as will support a predetermined height of the liquid in the measuring chamber against the action of gravity, means for discharging the liquid from the measuring chamber and an overflow chamber above the constriction.

RALPH F. BROWN.